(12) United States Patent
Bibas (10) Patent No.: US 10,416,444 B2
(45) Date of Patent: Sep. 17, 2019

(54) BEAM DIRECTOR WITH IMPROVED OPTICS

(71) Applicant: Charles Bibas, Great Neck, NY (US)

(72) Inventor: Charles Bibas, Great Neck, NY (US)

( * ) Notice: Subject to any disclaimer, the term of this patent is extended or adjusted under 35 U.S.C. 154(b) by 0 days.

(21) Appl. No.: 15/802,255

(22) Filed: Nov. 2, 2017

(65) Prior Publication Data

US 2018/0120556 A1    May 3, 2018

Related U.S. Application Data

(60) Provisional application No. 62/416,763, filed on Nov. 3, 2016.

(51) Int. Cl.
| | |
|---|---|
| *G02B 26/08* | (2006.01) |
| *G02B 26/10* | (2006.01) |
| *G02B 17/06* | (2006.01) |
| *G02B 27/09* | (2006.01) |
| *G02B 19/00* | (2006.01) |
| *B29C 64/209* | (2017.01) |

(52) U.S. Cl.
CPC ..... *G02B 26/0816* (2013.01); *G02B 17/0673* (2013.01); *G02B 19/0023* (2013.01); *G02B 19/0047* (2013.01); *G02B 26/105* (2013.01); *G02B 27/0911* (2013.01); *G02B 27/0983* (2013.01); *B29C 64/209* (2017.08)

(58) Field of Classification Search
CPC .......................... G02B 26/0816; G02B 26/105
See application file for complete search history.

(56) References Cited

U.S. PATENT DOCUMENTS

| | | | | | |
|---|---|---|---|---|---|
| 4,699,447 | A | * | 10/1987 | Howard | G06K 7/10693 359/203.1 |
| 5,177,347 | A | * | 1/1993 | Wike, Jr. | G06K 7/10613 235/454 |
| 5,742,402 | A | * | 4/1998 | Kobayashi | H04N 1/32005 358/404 |
| 6,085,980 | A | * | 7/2000 | Dickson | B82Y 15/00 235/462.24 |
| 9,435,998 | B1 | * | 9/2016 | Bibas | G02B 26/0816 |

* cited by examiner

*Primary Examiner* — Charlie Y Peng (57) ABSTRACT

A beam director for use in 3D printers comprises a first mirror rotating about its longitudinal axis for redirecting a beam onto a second mirror and then onto a work surface, which may result in a beam with a distorted elliptical shape. A beam corrector, e.g. a lens or a reflective surface, is used to ensure the beam has the same dimensions in first and second perpendicular directions.

12 Claims, 8 Drawing Sheets

FIG. 11

BEAM DIRECTOR WITH IMPROVED OPTICS

RELATED APPLICATIONS

The present application claims priority from U.S. Patent Applications 61/416,763 filed Nov. 3, 2016, which is incorporated herein by reference.

TECHNICAL FIELD

The present invention relates to a beam director, and in particular to a beam director for a 3D printer including a first rotating reflector and a second rotating conical reflector.

BACKGROUND

A beam director for use in 3D printers, such as the one disclosed in U.S. Pat. No. 9,435,998, which is incorporated herein by reference, comprises a first mirror rotating about its longitudinal axis, with a reflective surface at an acute angle to the longitudinal axis. Accordingly, a beam transmitted along the longitudinal axis may be redirected onto a second mirror, and then to a work surface, which is typically perpendicular to the longitudinal axis.

The second mirror may take the form of a rotating flat mirror or a stationary arcuate mirror, which is used to reflect the beam along straight or arcuate paths on the work surface.

Lower case x, y and z denotes local beam coordinates: In this application we define a lower case x, y and z coordinates system that is cartesian coordinates that are local to the beam. Lower case z denotes the direction of the beam while x and y denotes the beam size. Therefore, any reference to lower case x, y or z axis will be referring to local coordinates of the beam.

Upper case X, Y and Z denotes global system coordinates shown in FIGS. 2, 3, 4, 5, 6, 9 and 10.

Figure 1:
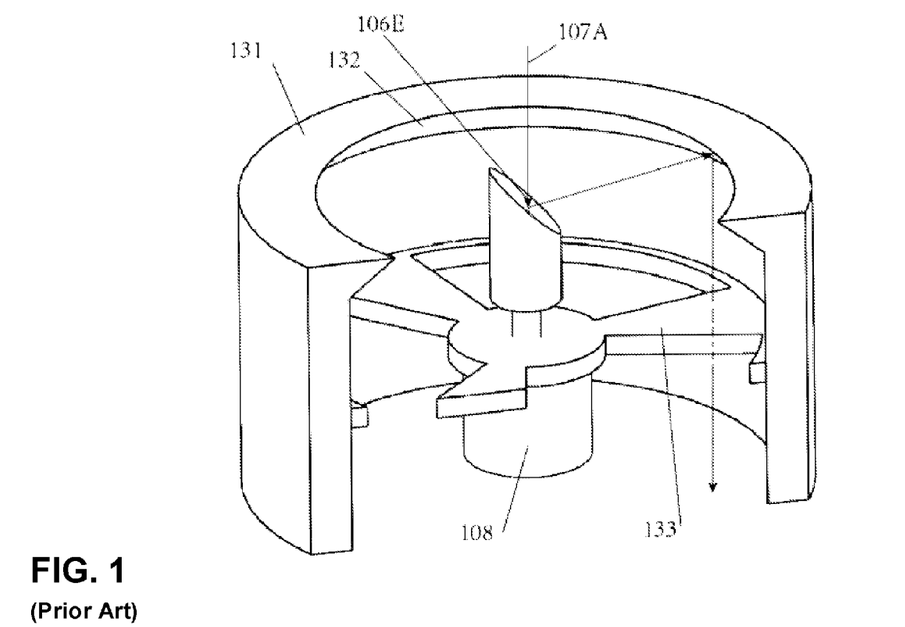
FIG. 1. Is an isometric view of a beam director system.

With reference to FIG. 1, an embodiment of the aforementioned beam director includes a first reflector 106E, which is rotatable by an actuator 108 and which reflects the beam 107A onto a second conical reflector 131, which is based on a typical cone shaped segment. The reflective surface 132 of the second conical reflector 131 re-directs the beam 107A by about 90° onto a work surface. After the the beam 107A hits the conical reflector surface 132, the beam property will change as follows considering a collimated beam source 107A:

The beam will keep moving in the Z direction (90° shift); caused by the 45° cone.

Figure 4:
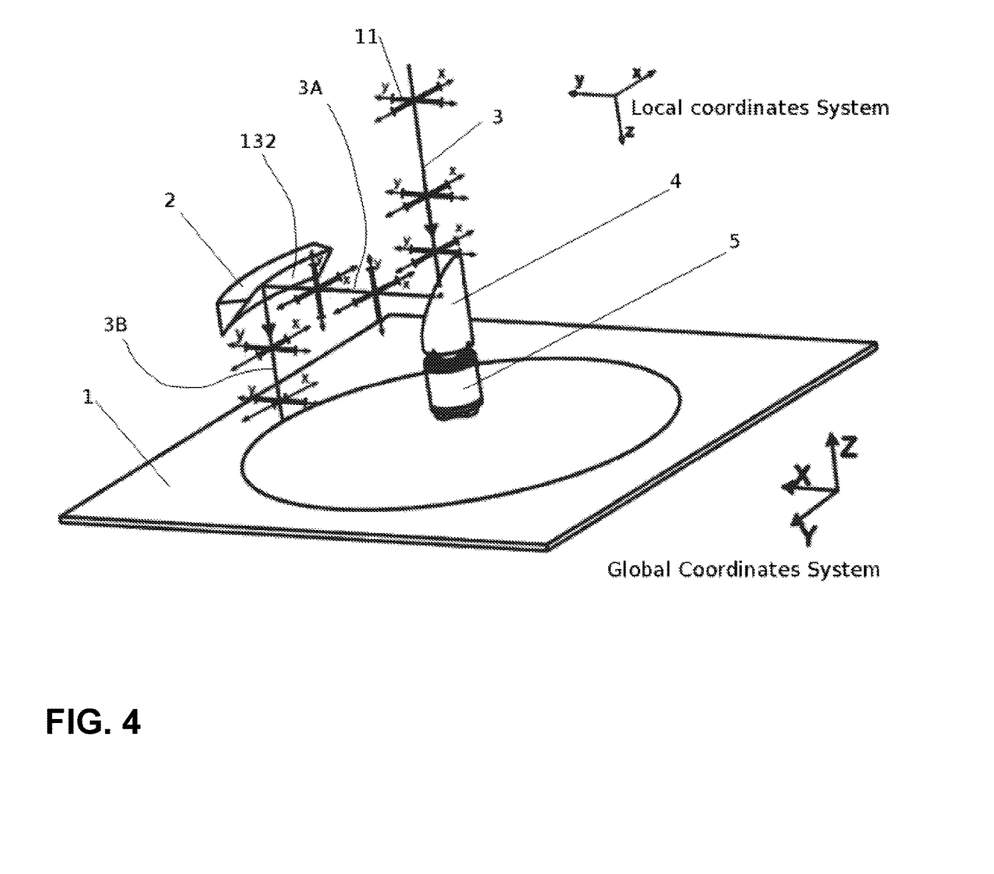
FIG. 4. View of a beam director system showing beam diameter changes
Figure 5:
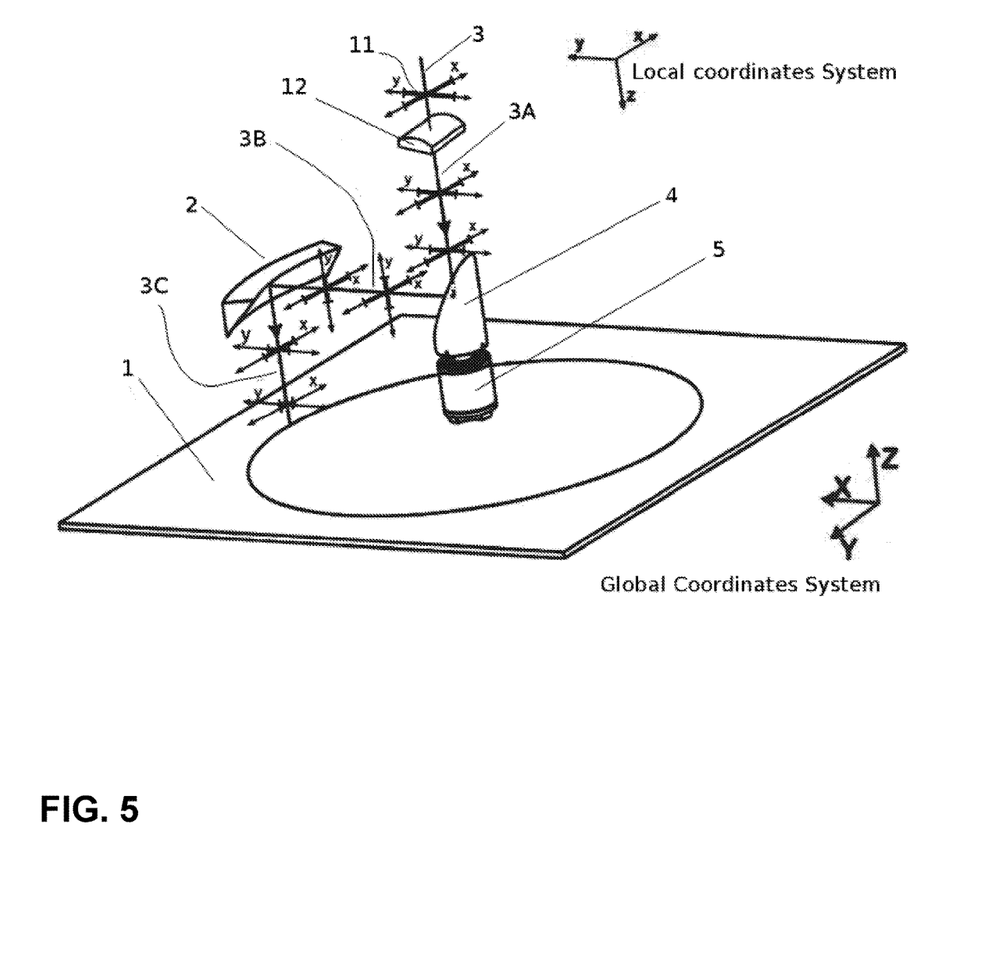
FIG. 5. View of a beam director system with a correcting cylindrical lens

When the source beam 3 is collimated, the beam x component 3B will no longer be parallel to the Z direction, as the cone curve will bring into focus the x component because of the rule of deflection as shown in FIG. 4.

The cone curve along the radius of 132 will add an optical diversion in the x axis that is proportional to the radius of the conical reflector 132. As an example, this will add a focal point proximate to the work surface in the x axis only, thus causing the departing beam 107A from the conical reflector 132 to have different focal point for x and for y. This is an undesired result: the desired result is either a collimated beam or a focusing beam in both x and y axis. To clarify; see FIG. 4, if beam 3 is a circular collimated beam with diameter D that is initially sent from a light source, the resulting beam output after the conical reflector 132 will have a distorted elliptic shape: Dx, the beam size in the x axis will be smaller than Dy, the beam size in the y axis, (11) before reaching the focal point and after reaching the focal point the x dimension of the beam 3B will be expending as the beam 3B continues to travel. The beam size components 11 are shown in FIG. 4 where the x component size is described by Dx and the y component by Dy respectfully.

Accordingly, an object of the present invention is to address the optical components for handling the beam of the prior art by providing corrective elements, whereby the beam has the same dimension in the first and second directions when incident on the work surface or when the beam keeps the proportion between the first and second directions when incident on the work surface.

SUMMARY

The present invention relates to a beam director comprising:

a rotatable first reflector rotatable about a longitudinal axis for receiving a beam from a beam source along the longitudinal axis, the first reflector including a reflective surface at an acute angle to the longitudinal axis for reflecting the beam;

an actuator for rotating the first reflector about the longitudinal axis, whereby the first reflector rotates and reflects the beam at a constant angle to the longitudinal axis;

a second conical reflector rotated by the actuator and rotating in a circle around the longitudinal axis of first reflector as first reflector rotates; constantly facing the first reflector at a constant angle; the second reflector further configured to reflect the beam towards a work surface at a constant angle thereto, whereby when the beam is activated and the actuator rotates the first and second reflectors, the beam strikes the rotating first reflector rotating the beam and reflecting the beam to the second reflector, which reflects the beam to the work surface; the beam then following a curve path relative to the work surface, tracing out an arc on the work surface.

DETAILED DESCRIPTION

Figure 2:
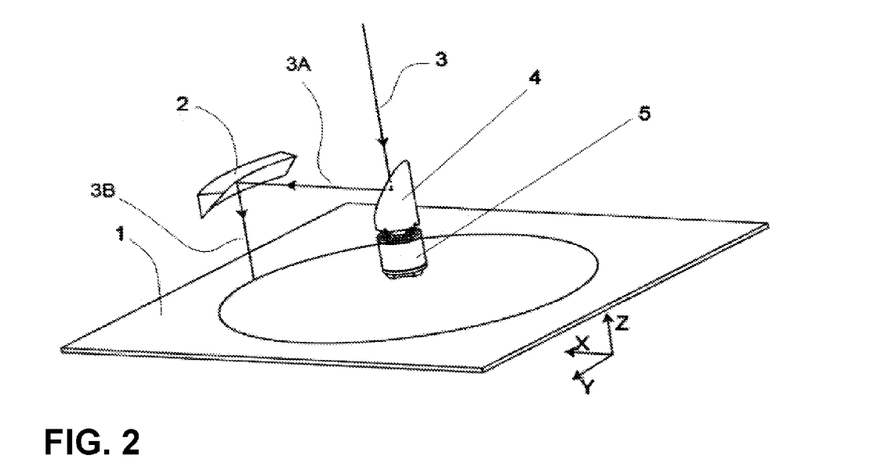
FIG. 2. Is a simplified view of a Beam director system with a print bed
Figure 3:
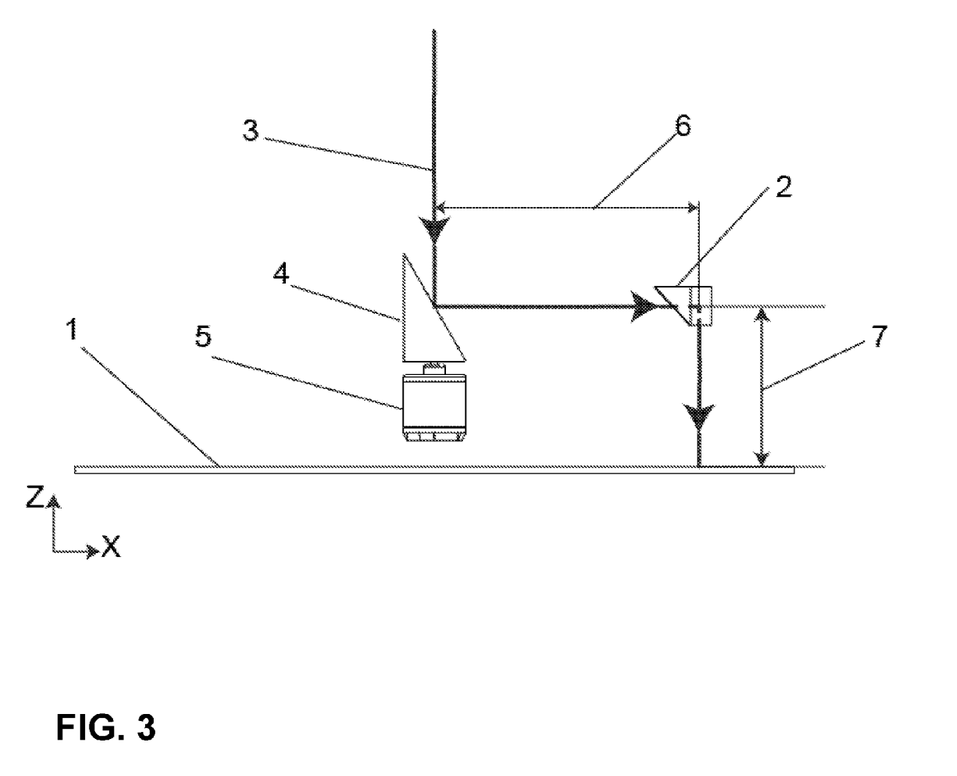
FIG. 3. 2D View of a beam director system
Figure 6:
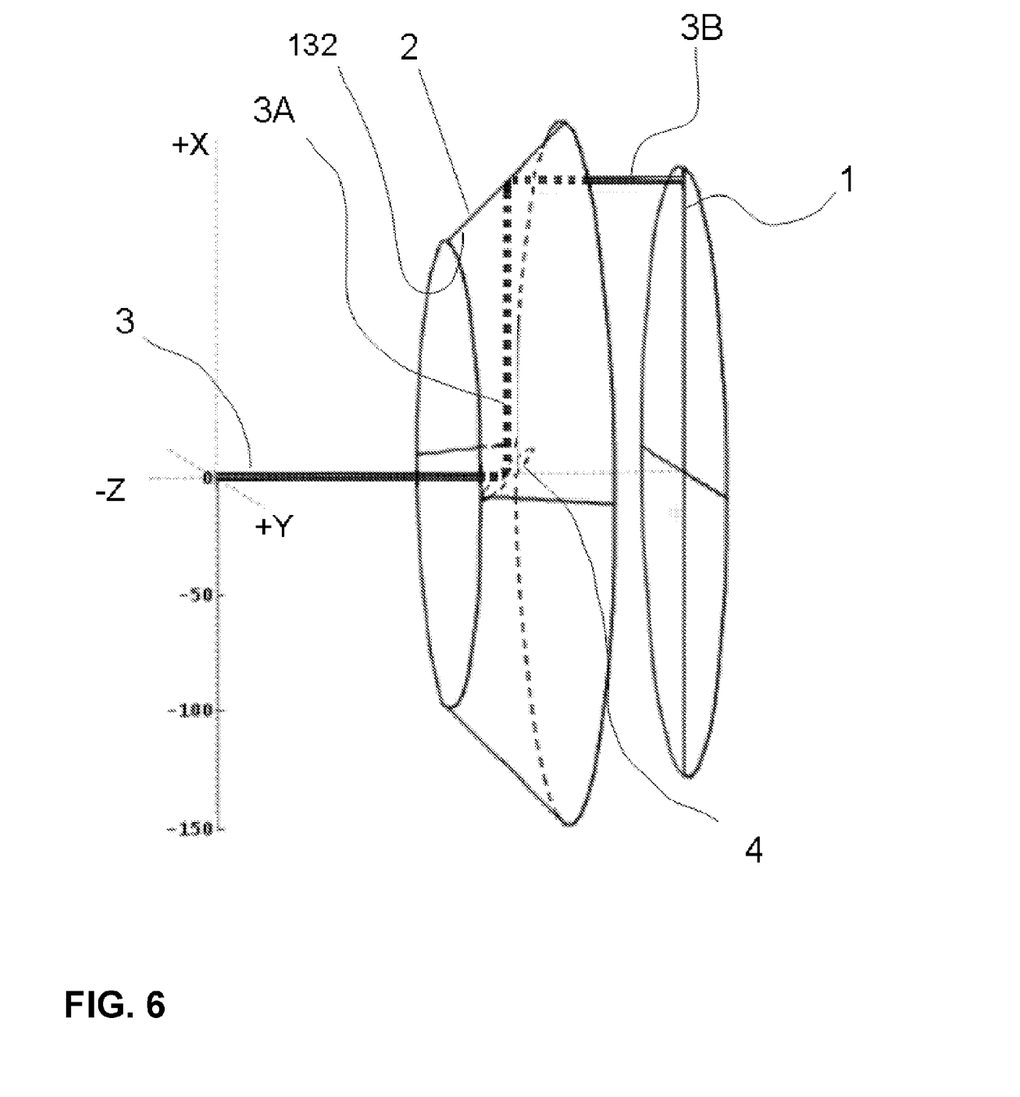
FIG. 6. Simulation of beam tracing when second reflector is a cone
Figure 7:
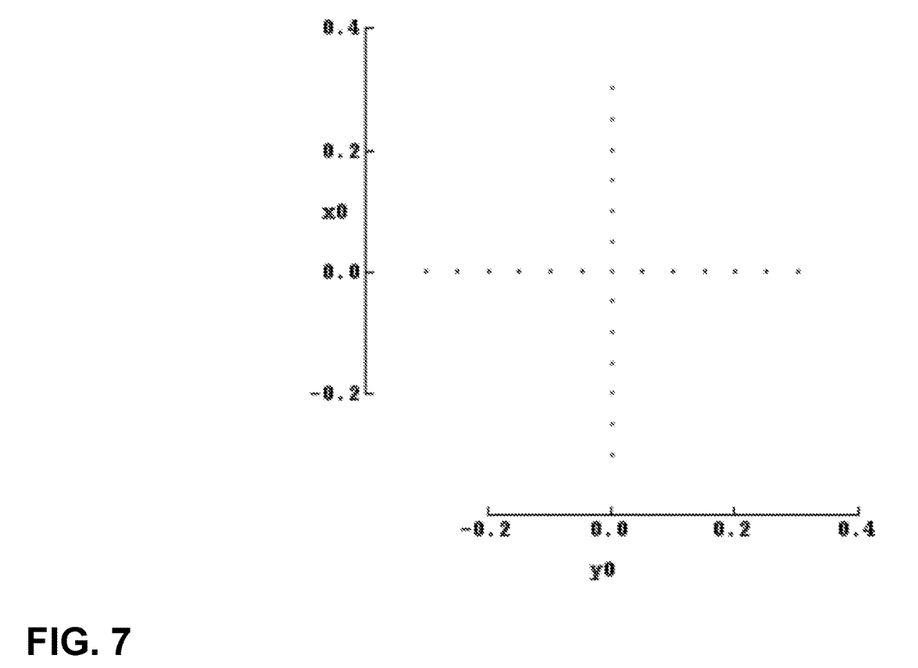
FIG. 7. Collimated beam represented at the source composed of 2 lines orthogonal to each other represented by x0 and y0 showing symmetry.

With reference to FIGS. 2,3 and 6, a collimated beam 3 is launched from a light source, e.g. laser, (x0, y0) with a round beam structure denotes by two orthogonal lines FIG. 7, directed towards rotating mirror 4 as shown in FIG. 2, 3. The rotating mirror 4 is rotated about a longitudinal axis by an actuator 5. The beam 3 is launched by the light source along the longitudinal axis, and the beam 3 will be redirected by a reflective surface disposed at an acute angle to the longitudinal axis, e.g. 45°, of the rotating mirror 4 to a conical reflector 2. The conical reflector 2 redirects the beam 3 again towards a work area 1. The conical reflector 2 need only be a portion of a full 360° cone, e.g. less than 90°, less than 45°, between 5° and 30°. The second conical reflector 2 may be mounted relative to and rotated with the first reflector 4 using any one of the embodiments illustrated in U.S. Pat. No. 9,435,998 or any other suitable manner. Similarly, the beam director of the present invention may be installed in any 3D printer positioning system, including the one disclosed in U.S. Pat. No. 9,435,998.

Figure 8:
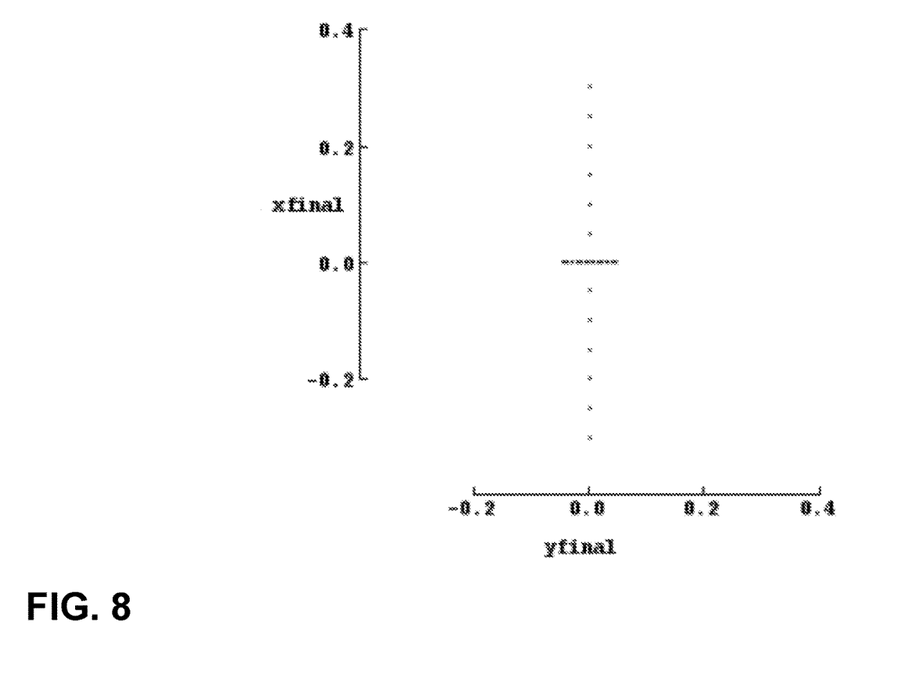
FIG. 8. Beam structure at work area where symmetry is lost. Beam at work area where y has lost collimation as it coming into a focus.

For the standard conical reflector 2, the beam 3 leaving the conical reflector 2 will get distorted because of the differences in focal lengths between the x and y axes. As a result the round beam launched from the light source 3 will become a distorted elliptical shape denotes by (xfinal, yfinal) as it hits the work area 1, as shown in FIGS. 6,7 & 8.

This distortion is a result of the curved surface of the conical reflector 2 in the x axis shown in FIG. 4. A curvature of a surface is defined by 1/R where R is the radius of curvature of the conical reflector 2. In fact, the conical reflector 2 is a focusing mirror with focal length of R. Which means that, if the work area 1 is at a distance of R from the conical reflector 2, the y properties of the beam 3 will be kept collimated while the x properties will come to focus resulting in an about elliptical beam 3B. FIG. 8 shows the shape of beam 3B as it coming to focus where the x dimension of the beam shrank, while the beam remains collimated in the y dimension. Please note: positioning the work area 1 at exactly the distance of R from the conical reflector 2 will result in seeing a narrow line with high intensity at the center.

FIG. 6. Illustrates a beam tracing simulation in which the second reflector is a mirror with a cone structure. FIG. 7 illustrates a beam source 3, which is round and symmetrical, while FIG. 8 illustrates the distorted results measured at the work surface. In short, the original collimated beam 3 in x dimension is not collimated 3B following deflection the second reflector 2.

Solution(s):

Method I:

Adding a cylindrical lens 12 between the light source and the work surface 1, preferably between the light source and the first reflector 4 to correct the beam 3 in the y direction so it will match the x component at the work area 1. Shown in FIG. 5. The lens location and focal point should be calculated so it will correct, i.e. bring beam 3 y component into focus at the work area 1.

As an example:

R=100 mm

Distance to work area (7)=100 mm; this is also the focus fx of the x component. We should choose a cylindrical lens with focal lens of more than 200 mm. We can choose cylindrical mirror with f=250 mm and marked it as fy. Now, positioning the cylindrical lens in a distance of 50 mm from the rotating mirror 4 will provide a sound solution where the fx and fy will land at the working area.

Method II:

In this method the x dimension will diverge prior to hitting the second reflector. When the expanded beam 3B will hit the second reflector it will be corrected back to a collimated beam.

Adding a diverging cylindrical lens 12 between the light source and the work surface 1, preferably between the light source and the first reflector 4, to diverge the x dimension of the beam 3 to produce a diverging 3A beam on the x dimension. After reflecting from first reflector 4, 3B will continue to diverge when hitting the second reflector 2. The second reflector 2 will converge the diverging beam. The convergence rate is dictated by the focal point of the second reflector (R) while the initial divergence rate is dictated by the cylindrical lens. Similarly to method I, the divergence rate can be calculated to achieve a symmetrical beam on the work surface.

Method III:

Conic Sections:

Conic sections are mathematical curves (parabolas, hyperbolas, circles etc.) that satisfy quadratic algebraic expressions (See Optical System Design, Robert E. Fischer Second Edition, Chapter 7 Page 117). Geometrically they are equivalent to the intersection of a cone with a plane, hence the name. When a conic section is rotated about an axis, it sweeps out a surface in three dimensions (paraboloid, hyperboloid, sphere or ellipsoid). Surfaces of this type are very useful in optics and defined by the following equation in the Vertex origin Cartesian coords:

$$z(r) = Cr^2/(1+\sqrt{1-(1+Asph)C^2r^2})$$

Where: $r^2 = x^2 + y^2$ where:

C: is the curvature of a surface at the coords origin; 1/radius r radius is the distance from Z axis to the surface Asph: asphericity, departure from spherical profile Asph=Shape−1

By using the conic section equation in this method to modify the reflective surface of the conical reflector 2 in the x direction by providing the y surface with matching curvature to the x curvature. Enforcing a deflection of 90° by choosing the surface slope/derivative to be 45° or 135°.

For convenience we enforced 135°, the invention allows a wider range of deflection angles.

$$z(r) = Cr^2/(1+\sqrt{1-(Asph+1)C^2r^2}) \quad (1)$$

$$r^2 = x^2 + y^2 \quad (2)$$

$$z'(r) = -1 \quad (3)$$

$$z(r) = -Cr\sqrt{(1-C^2(Asph+1)r^2)/(C^2(Asp+1)r^2-1)} \quad (4)$$

$$C^2r^2 = 1 - C^2(Asph+1)r^2 \quad (3)(4)$$

$$Asph = 1/C^2r^2 - 2 \quad (3)(4)$$

Selecting work distance between rotating reflector 2 to second reflector 5

$$r = R \quad (5)$$

$$Asph(C) = 1/C^2R^2 - 2 \quad (5)(3)(4)$$

$$Asph(C) = 1/C^2R^2 - 2 \quad (6)$$

Selecting C=1/R will resolve to Asph=−1 which is a paraboloid.

The above specifications will deliver a sound solution to correct beam 3 as it reaches the work surface 3C.

As the beam is circulating the Conic Section it will satisfy the requirement for reflector 2 to deflect the beam when beam 3A is circling. The deflection of deflection of 90° is achieved by choosing the surface slope/derivative to be 45° or 135° (derivative to be 1 or −1).

Figure 9:
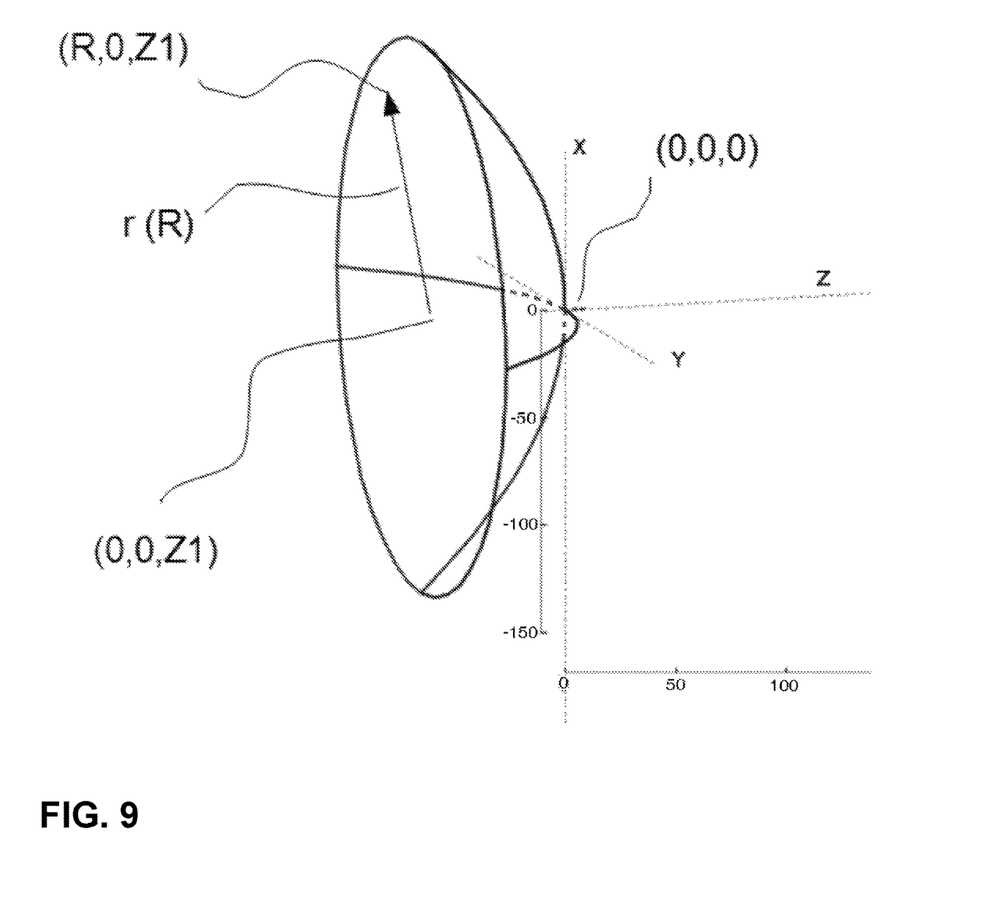
FIG. 9. Modified second reflector to match x/y curvatures
Figure 10:
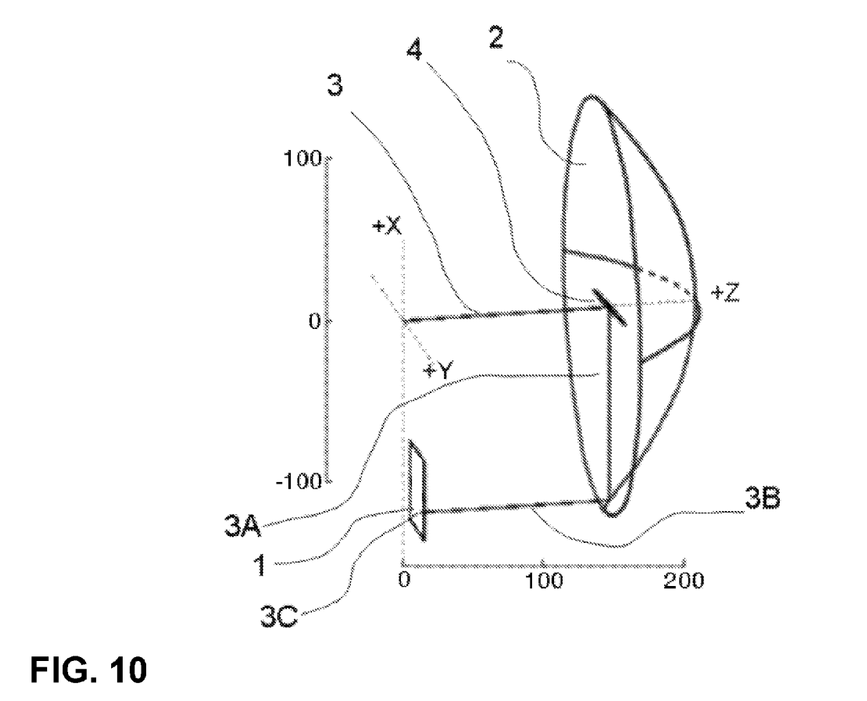
FIG. 10. Simulation of beam tracing where the final beam is corrected by the second reflector FIG. 11. Collimated beam represented at the source composed of 2 lines, orthogonal to each other represented by x0 and y0 showing symmetry.

As an example let's use R=125 mm→Curvature=0.008 while Asph=−1 FIG. 9. A curvature is defined as 1/Radius. In FIG. 9 R is parallel to XY plane. In this instance we position it perpendicular to the ZY plane as it make it easier for cartesian coordinates calculations.

Figure 11:
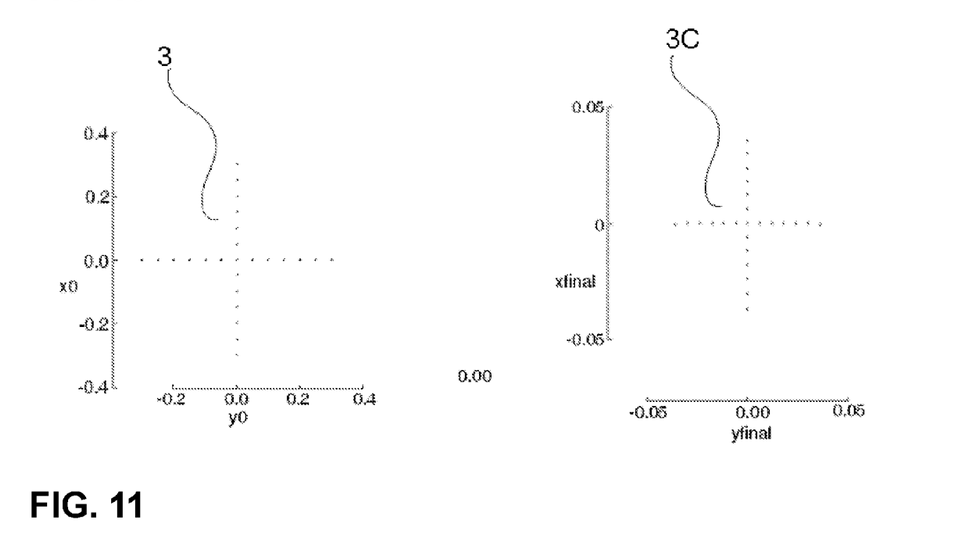

The results are clearly demonstrated where the beam 3 on the surface 1 represented by xfinal and yfinal and showing a nice round beam FIG. 11 compares to the results in FIGS. 6,7 & 8.

Implementing same matching curvature is one option. However, selecting other values for y curvature can be used when the source beam 3 is elliptical as it is the case with many laser diodes.

The scanning system is further improved as:

Lenses can be eliminated as the conical reflector 2 is a focusing lens as well.

Elimination or reduction in lenses will also reduce aberration

Elimination or reduction in lenses will reduce system tuneup

Similarly, Z(r) the curve function can alternatively be represented by polynomial coefficients to fulfill the imposed conditions.

$$z(r)=Cr^2/(1+\sqrt{1-(\text{Asph}+1)C^2r^2})+A_2r^2+A_4r^4+\ldots+A_jr^j$$

Additionally or alternatively, we can use only polynomials for the complete definition of the surface while imposing the required specifications.

$$z(r)=A_0r^0+A_1r^1+A_2r^2+A_3r^3+\ldots+A_jr^j$$

Polynomial terms are useful on their own, without curvature or asphericity, in polynomial optics such as Schmidt correctors. More often they are combined with curvature and asphericity to provide small high-order corrections to a surface. Usually, only the first few even coefficients are sufficient as A2, A4, and A6 since most optical surfaces will be very nearly approximated by the conic aspheric profile.

$$z(r)=Cr^2/(1+\sqrt{(1-\text{Asph}+1)C^2r^2})+A_2r^2+A_4r^4+\ldots+A_jr^j$$

Method IV:

A surface of the conical reflector 2 that fulfills the required conditions for any size beam and working radius. This surface can be formed as a composition of multiple sliced surfaces. Where each slice "i" has its own "Ri", this way we use the aspherical equation for each slice with its own parameter. C will now be C(Ri) as C depends on R.

with a Z(r) function where C is the curvature will be defined as C(R(r)). C is a variable that is dependent on r which depends on work distance from the origin z.

One way to define this surface is by setting multiple R points into a spreadsheet and calculating the C results by using the conical curve surface equation to create the slice.

The aspherical equation now is simplified by setting Asph=−1 and setting C=1/ri where ri is the work distance (the place the beam will be deflected):

$$z(r)=Cr^2/(1+\sqrt{(\text{Asph}+1)C^2r^2})$$

Setting $C(ri)=1/ri$ $$z(ri)=ri/(1+\sqrt{1})$$

$$z(ri)=ri/2$$

Now for each ri we calculate the slice surface z for it.

Similarly, we can define the surface with further correction using polynomials where we calculate the polynomial coefficients be setting multiple points for R.

$$z(r)=Cr^2/(1+\sqrt{(1-\text{Asph}+1)C^2r^2})+A_2r^2+A_4r^4+\ldots+A_jr^j$$

Incorporating the focus properties into the mirror 4 will improve aberration and calibration of the system as a single element performs two functions.

The invention claimed is:

1. A beam director comprising
   a rotatable first reflector rotatable about a longitudinal axis for receiving a beam from a beam source along the longitudinal axis, the first reflector including a reflective surface at an acute angle to the longitudinal axis for reflecting the beam;
   an actuator for rotating the first reflector about the longitudinal axis, whereby the first reflector rotates and reflects the beam at a constant angle to the longitudinal axis;
   a second annular reflector around the longitudinal axis of first reflector as first reflector rotates, configured to reflect the beam towards a work surface at a constant angle thereto . . .
   a beam corrector for ensuring the beam has the same dimensions in first and second perpendicular directions;
   whereby when the beam is activated and the actuator rotates the first reflector, the beam strikes the rotating first reflector rotating the beam and reflecting the beam to the second reflector, which reflects the beam to the work surface; and
   wherein the beam corrector comprises a reflective surface on the second annular reflector with the matching curvature in a first (x) direction as in a second (y) perpendicular direction, whereby the beam has the same dimension in the first and second directions when incident on the work surface.

2. The beam director according to claim 1, wherein the second reflector reflects the beam from the first reflector parallel to the longitudinal axis of first reflector and perpendicular to the work surface.

3. A printer head for a three-dimensional printer comprising the beam director of claim 1.

4. A beam director comprising
   a rotatable first reflector rotatable about a longitudinal axis for receiving a beam from a beam source along the longitudinal axis, the first reflector including a reflective surface at an acute angle to the longitudinal axis for reflecting the beam;
   an actuator for rotating the first reflector about the longitudinal axis, whereby the first reflector rotates and reflects the beam at a constant angle to the longitudinal axis;
   a second annular reflector around the longitudinal axis of first reflector as first reflector rotates, configured to reflect the beam towards a work surface at a constant angle thereto . . .
   a beam corrector for ensuring the beam has the same dimensions in first and second perpendicular directions;
   whereby when the beam is activated and the actuator rotates the first reflector, the beam strikes the rotating first reflector rotating the beam and reflecting the beam to the second reflector, which reflects the beam to the work surface;
   wherein the second annular reflector focuses the beam in the second direction, but not in the first direction; and wherein the beam corrector comprises a cylindrical lens for expanding the beam in the second direction, whereby the beam has the same dimension in the first and second directions when incident on the work surface.

5. The beam director according to claim 4, wherein the second reflector reflects the beam from the first reflector parallel to the longitudinal axis of first reflector and perpendicular to the work surface.

6. A printer head for a three-dimensional printer comprising the beam director of claim 4.

7. A beam director comprising
a rotatable first reflector rotatable about a longitudinal axis for receiving a beam from a beam source along the longitudinal axis, the first reflector including a reflective surface at an acute angle to the longitudinal axis for reflecting the beam;
an actuator for rotating the first reflector about the longitudinal axis, whereby the first reflector rotates and reflects the beam at a constant angle to the longitudinal axis;
a second annular reflector around the longitudinal axis of first reflector as first reflector rotates, configured to reflect the beam towards a work surface at a constant angle thereto . . .
a beam corrector for ensuring the beam has the same dimensions in first and second perpendicular directions;
whereby when the beam is activated and the actuator rotates the first reflector, the beam strikes the rotating first reflector rotating the beam and reflecting the beam to the second reflector, which reflects the beam to the work surface;
wherein the second annular reflector focuses the beam in the second direction, but not in the first direction; and
wherein the beam corrector comprises a cylindrical lens for focussing the beam in the first direction, whereby the beam has the same dimension in the first and second directions when incident on the work surface.

8. The beam director according to claim 7, wherein the second reflector reflects the beam from the first reflector parallel to the longitudinal axis of first reflector and perpendicular to the work surface.

9. A printer head for a three-dimensional printer comprising the beam director of claim 7.

10. A method of directing a beam towards a work surface with a beam director, the method comprising:
generating a beam with a beam source;
rotating a first reflector about a longitudinal rotational axis with an actuator;
directing the beam towards the first reflector along the longitudinal rotational axis of the first reflector;
disposing a second annular reflector constantly facing the first reflector at a constant angle as the first reflector rotates;
reflecting the beam with the first reflector at a constant angle to the longitudinal axis towards the second reflector;
reflecting the beam with the second reflector towards a work surface;
correcting the beam ensuring that the beam has the same dimensions in first and second perpendicular directions;
whereby when the beam is activated and the actuator rotates the first and second reflectors, the beam strikes the rotating first reflector rotating the beam and reflecting the beam to the second reflector, which reflects the beam to the work surface; the beam then following a curve path relative to the work surface, tracing out an arc on the work surface;
wherein the second annular reflector has a reflective surface with the same curvature in a first (x) direction as in a second (y) perpendicular direction, whereby the beam has the same dimension in the first and second directions when incident on the work surface.

11. A method of directing a beam towards a work surface with a beam director, the method comprising:
generating a beam with a beam source;
rotating a first reflector about a longitudinal rotational axis with an actuator;
directing the beam towards the first reflector along the longitudinal rotational axis of the first reflector;
disposing a second annular reflector constantly facing the first reflector at a constant angle as the first reflector rotates;
reflecting the beam with the first reflector at a constant angle to the longitudinal axis towards the second reflector;
reflecting the beam with the second reflector towards a work surface;
correcting the beam ensuring that the beam has the same dimensions in first and second perpendicular directions;
whereby when the beam is activated and the actuator rotates the first and second reflectors, the beam strikes the rotating first reflector rotating the beam and reflecting the beam to the second reflector, which reflects the beam to the work surface; the beam then following a curve path relative to the work surface, tracing out an arc on the work surface;
wherein the second annular reflector focuses the beam in the second direction, but not in the first direction; and further comprising expanding the beam in the second direction with a cylindrical lens, whereby the beam has the same dimension in the first and second directions when incident on the work surface.

12. A method of directing a beam towards a work surface with a beam director, the method comprising:
generating a beam with a beam source;
rotating a first reflector about a longitudinal rotational axis with an actuator;
directing the beam towards the first reflector along the longitudinal rotational axis of the first reflector;
disposing a second annular reflector constantly facing the first reflector at a constant angle as the first reflector rotates;
reflecting the beam with the first reflector at a constant angle to the longitudinal axis towards the second reflector;
reflecting the beam with the second reflector towards a work surface;
correcting the beam ensuring that the beam has the same dimensions in first and second perpendicular directions;
whereby when the beam is activated and the actuator rotates the first and second reflectors, the beam strikes the rotating first reflector rotating the beam and reflecting the beam to the second reflector, which reflects the beam to the work surface; the beam then following a curve path relative to the work surface, tracing out an arc on the work surface;
wherein the second annular reflector focuses the beam in the second direction, but not in the first direction; and further comprising focussing the beam in the first direction with a cylindrical lens, whereby the beam has the same dimension in the first and second directions when incident on the work surface.

\* \* \* \* \*